B. P. HAZELTINE.
INGOT.
APPLICATION FILED MAR. 5, 1921.

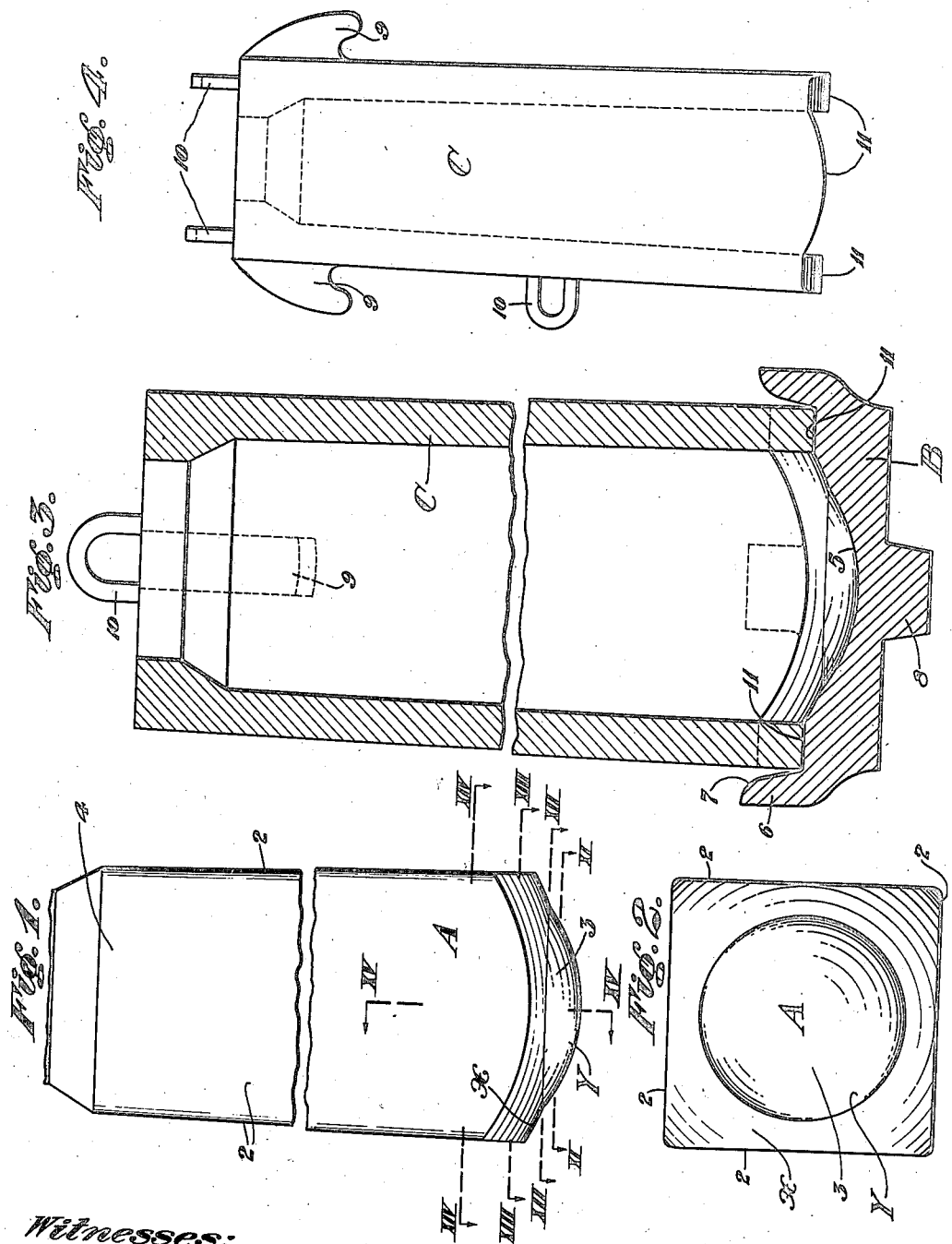

1,417,246.

Patented May 23, 1922.
4 SHEETS—SHEET 2.

Witnesses:
Edwin Trueb

Inventor:
Benjamin P. Hazeltine.
By: D. Anthony Usina
Attorney

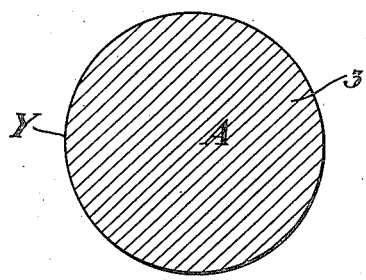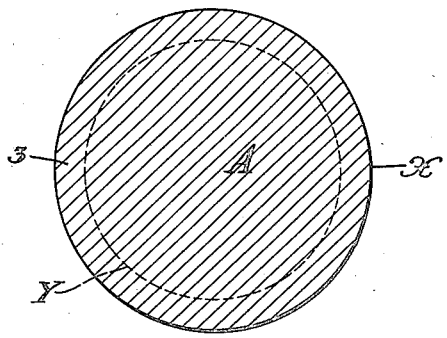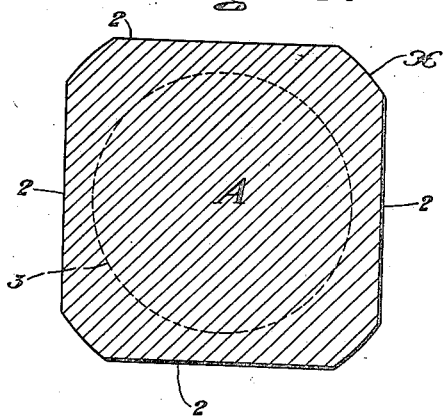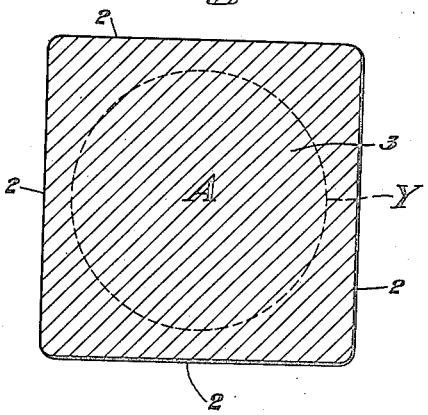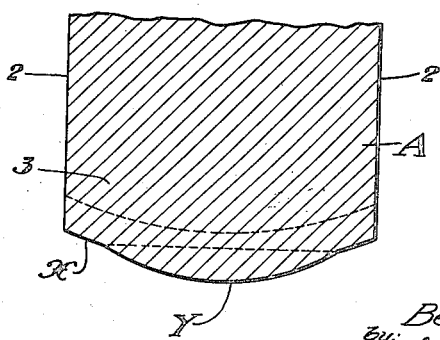

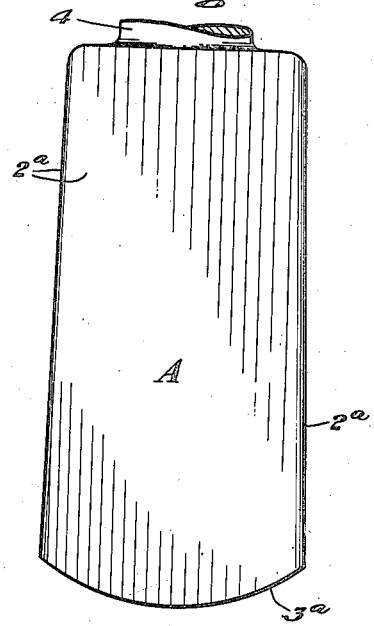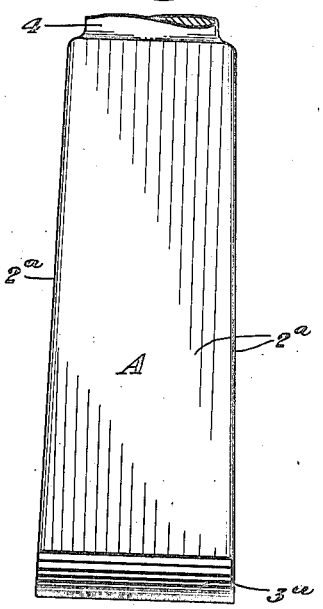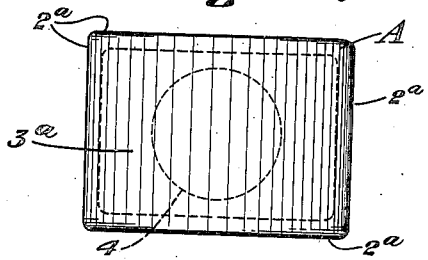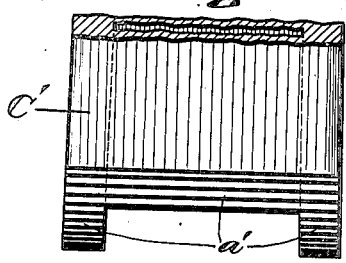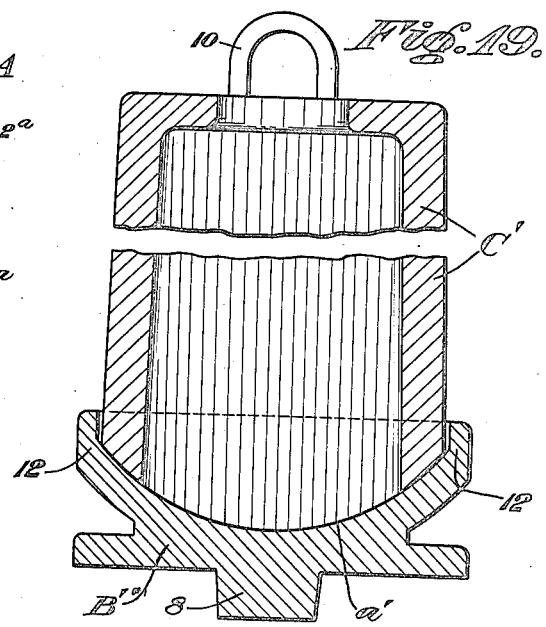

UNITED STATES PATENT OFFICE.

BENJAMIN P. HAZELTINE, OF WHEELING, WEST VIRGINIA.

INGOT.

1,417,246.  Specification of Letters Patent.  Patented May 23, 1922.

Application filed March 5, 1921. Serial No. 449,789.

*To all whom it may concern:*

Be it known that I, BENJAMIN P. HAZELTINE, a citizen of the United States, residing in Wheeling, in the county of Ohio and State of West Virginia, have invented certain new and useful Improvements in Ingots, of which the following is a specification.

My invention relates to the manufacture of ingots of the class used in making semi-finished products, such as blooms, billets, and slabs, and similar materials later rolled or forged into finished commercial products.

Heretofore, in so far as I am aware, large steel ingots of the class to which my invention primarily relates, have been cast with a flat or substantially flat end surface at the large or butt-end of the ingots, with the flat end surface extending in a plane at right angles to the longitudinal center of the ingot.

When such ingots are later elongated and reduced in cross section by rolling or forging, the metal at the corners formed by the intersection of the side surfaces of the ingot with each other and with the flat butt-end surface, is elongated more than the metal at the edges formed by the intersection of the sides with the flat end surface of the butt-end of the ingot adjacent to the middle of the width of the sides, and the metal adjacent to the edges formed by the intersection of the side surfaces and butt-end surface is elongated considerably more than the metal adjacent to the longitudinal center of the ingot.

The result is that the stresses set up in the metal in the butt-end of the ingot by the rolling operations tear the metal and cause the butt-end of the ingots to split lengthwise, the split ends curving outwardly so as to hamper the entrance of the metal by the rolls of the successive reducing passes and necessitating the split end portions to be cropped or cut off and discarded as waste material.

One object of my invention is to provide an ingot having a butt-end of novel configuration, whereby splitting of the ends during the rolling or forging of the ingots is avoided and overcome, the scrap loss is materially lessened and the manufacturing cost is greatly reduced.

Another object of the invention is the provision of an ingot mold and mold stool of novel construction whereby the casting of ingots forming part of this invention is facilitated and made possible.

A still further object of the invention is the provision of ingot molds and coacting ingot mold stools provided with contiguous faces having novel constructions, arrangement and combination of parts shown in the appended claims.

Referring now to the drawings forming part of this specification, Figure 1 is a side elevation showing an ingot having the butt-end thereof made in accordance with my invention.

Figure 2 is an inverted plan showing details in the construction of the base or butt-end of the ingot of Figure 1.

Figure 3 is a sectional elevation showing a preferred form of ingot mold and ingot mold stool as constructed in accordance with my invention, and adapted for use in making the ingot forming the novel feature of the invention.

Figure 4 is a side elevation of the ingot mold of Figure 3 in a plane at right angles to that of the sectional elevation of Figure 3.

Figure 11 is a view on the line XI—XI of Figure 1.

Figure 5:
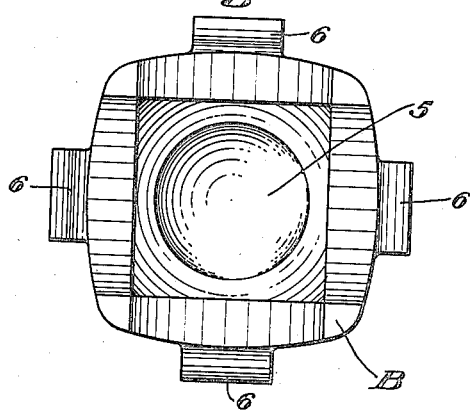
Figure 5 is a plan of the ingot mold stool of Figure 3.

Figures 12, 13, 14, and 15, are views, respectively, taken on the lines XII—XII, XIII—XIII, XIV—XIV, and XV—XV of Figure 1.

Figure 16 is a side elevation showing an ingot adapted to be rolled into slabs embodying my invention.

Figure 17 is a side elevation in a plane at right angles to that of the elevation of Figure 16.

Figure 18 is a bottom plan of the ingot of Figures 16 and 17.

Figure 19 is a sectional elevation, showing an ingot mold and ingot mold stool constructed in accordance with my invention and adapted for use in making the ingot of Figures 16 and 17.

Figure 20 is a fragmentary side elevation of the ingot mold of Figure 19.

In the drawings, two forms of ingots employing my invention are shown. The ingot illustrated in Figures 1 and 2, and 10 to 15 is of square cross section, being primarily intended for use in making blooms and billets and similar products, and the other form shown in Figures 16, 17 and 18, which is of rectangular cross section, being particularly applicable for use in making slabs and other products of a width considerably greater than the thickness thereof.

Both ingots have flat, or substantially flat sides, with the surface of the butt-end of the ingot of curved configuration, and both of the ingots tapering inwardly lengthwise from the butt-end toward the upper end thereof.

The upper end of the ingot may be flat with the end surface extending in a plane substantially at right angles to the longitudinal axis of the ingot, or may be made in a mold with the upper end of the ingot chamfered off in a manner as shown in Figure 1, or the ingot may have a neck 4 of reduced cross section formed in a manner illustrated in Figures 16 to 18.

In Figures 1 and 2, and 10 to 15 of the drawings, ingots A embodying my invention are shown, the ingots being rectangular in cross section, and having flat side surfaces 2 with the sides of the ingots tapering from the base or butt-end 3 to the smaller upper end 4 thereof, in the usual well known manner.

The butt-end or base 3 of my improved ingot is rounded off so as to have a curved surface instead of a flat surface extending in a plane at right angles to its longitudinal axis, as in the ordinary ingot. I have discovered that when the surface of the butt-end of ingots are curved so as to provide what is in effect a substantial protuberance thereof, the usual lengthwise splitting of the ingot when the ingots are reduced in cross section and elongated by rolling or forging, as is done in forming the ingots into blooms, billets, slabs and semi-finished products, is eliminated. The result is that a larger percentage of the metal in the butt-end of rolled ingots will be solid, so that the amount of rolled metal necessary to discard as scissel will be considerably less than in the case of ingots having the usual flat butt-end.

In casting the ingots of my improved design, a mold stool B is employed, having a curved depression in its upper surface. In the stool B shown in Figures 3, 5 and 6, the depression 5 is shown, although this depression may also be formed as shown in the stools B' of Figures 7 and 8. I have found in practice, however, that in order to provide a sufficient protuberance on the bottom or butt-end of an ingot to prevent splitting, a small radius is necessary, which necessitated the cutting of the stool to form a curved depression on the line of a small radius arc. However, this style of design of stool left an extremely acute angle on the bottom of the mold walls which is undesirable. Therefore, a double radius is adopted and the outer portion of the stool is cut on the arc of a large radius, while a center is cut on the arc of a small radius.

The result of this formation is that the protuberance or curved butt-end of the ingot has a double curved surface, the outer portion X having a larger radius than the center portion Y.

Figure 6:
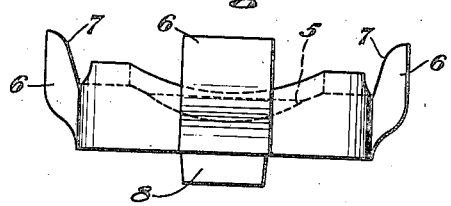
Figure 6 is a side elevation of the mold stool of Figure 5.

The mold stool of Figures 3, 5, and 6 has an outwardly extending lug 6 on each of its four sides with the contiguous faces 7 of the lugs curved and tapering in order to center the mold when positioning it on the stool for pouring. The stool also has the usual projection 8 on its bottom surface by which it is located and held on a mold car (not shown) on which the molds are mounted when ingots are being poured.

The ingot mold C is made with its upper end constructed to form a "closed top" mold, a cap generally being used with such molds, or the mold may have an open end of the usual construction. Lifting lugs 9 and ears 10 will be provided for handling the mold as shown, or in any other approved manner.

In order to avoid the formation of acute angles on the bottom surfaces of the mold, they preferably will be constructed in the manner shown in Figures 3 and 4, being formed with the lower end surfaces 11 extending at right angles to the longitudinal center of the mold in one plane, and being curved transversely in the opposite plane.

Figure 7:
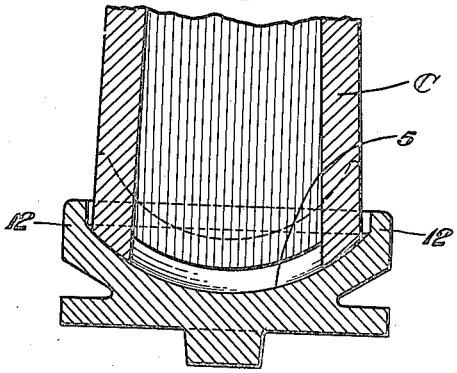
Figure 7 is a sectional side elevation showing a modified form of ingot mold stool, and the lower end of a modified ingot mold constructed in accordance with this invention.
Figure 8:
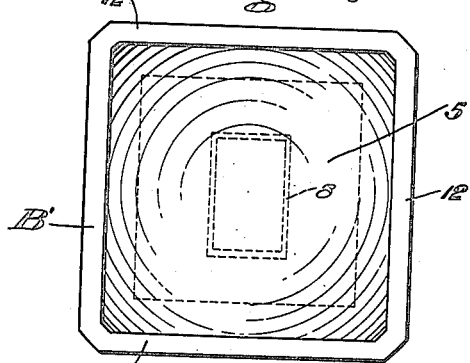
Figure 8 is a plan of the ingot mold stool shown in Figure 7.
Figure 10:
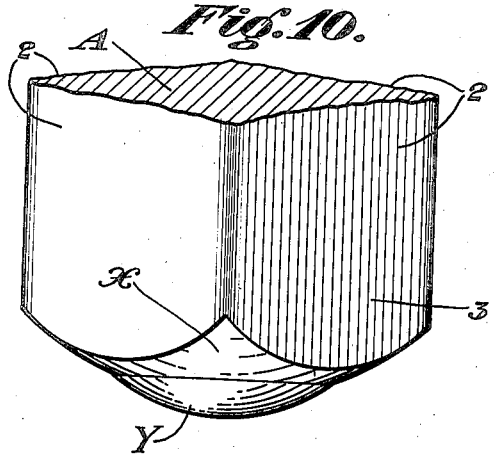
Figure 10 is a fragmentary view, taken at one corner of the ingot of Figure 1, showing the curved bottom.
Figure 9:
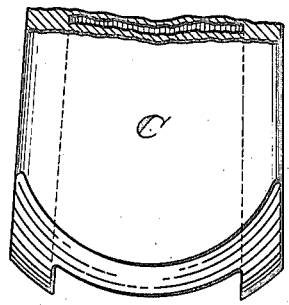
Figure 9 is a side elevation showing the lower end of the ingot mold of Figure 7.

When desired, the end of the mold may be formed truly hemispherical, in such case a mold stool B', like that shown in Figures 7 and 8 is employed. In such stools the bottom of the cavity or depression in the upper surface of the stool is truly hemispherical on a line with a single arc, and the stool has marginal flanges 12 on its upper surfaces which intersect with and extend upwardly above the curved bottom 5 of the cavity in the upper face of the stool as is shown in Figure 7.

The ingot of Figures 16 to 18 is rectangular in cross section and has flat side surfaces 2ª, and the butt-end of the ingot 3ª is curved from one side to the other, the curve being in effect the segment of a cylinder and the curved surface extending from one side surface to the other. This particular shaped ingot is for use in making slabs and other products of a width considerably greater than their thickness.

In Figure 19 a mold for making this other form of ingot is shown. The mold body C' is generally the same as that before described for making the first form of ingot, but has a greater width than thickness, and has its bottom end rounded or curved to approximate the segment of a cylinder as at $a'$. The stool B'' is cut out on a line with the curve of the bottom of the mold C' and is otherwise similar in construction to the form of stool shown in Figure 7, having a marginal flange 12 and the usual projection 8 for locating and holding it in the mold car not shown.

In casting the ingots, the stools B are positioned on the mold cars and the ingot molds C are placed on the stools in the usual and well known manner. The steel is poured into its upper end until the mold is entirely filled.

After the ingots are cast the mold cars are transferred to an ingot stripper and the mold is lifted from the ingot in the usual way; the ingots then being transferred to the soaking pit for the rolling operation.

After being reheated, the ingots may be rolled or forged in any desired manner so as to reduce the cross sectional area of the ingots and form a product having the desired transverse dimensions, the length of the rolled ingot, of course, depending upon the amount of reduction in the cross sectional area of the cast ingot in the rolling operations.

It is found that when the base or butt-end of the ingots are formed with a rounded or substantial hemispherical end in the manner which has been described, that instead of the butt-end of the ingots splitting lengthwise for some distance a substantially solid end will be obtained on the rolled product which, when cropped, will be free of holes so that the amount of metal necessary to cut off and discard from the base or butt-end of the ingot is materially lessened and the scrap loss considerably reduced.

The advantages of my invention will be apparent to those skilled in the art. The result from the absence of splitting of the base or butt-end the cast ingot, the amount of metal necessary to crop off this end of the rolled product is much less than is required with ingots of the usual design, in order to secure a rolled product with solid ends.

Many modifications in the construction of the butt-end of the ingots and in the molds and stools used in casting the ingots may be made without departing from my invention as defined in the appended claims.

I claim:—

1. As a new article of manufacture, an ingot of rectangular cross section, having lengthwise tapering sides and having a rounded surface on the base or butt end thereof, said rounded surface having an unequal curvature of two radii.

2. In the manufacture of ingots, the combination with an ingot mold having an open lower end and having a cavity of rectangular cross section, and upwardly converging sides, of a mold stool supporting the mold, said stool having a cavity in its upper face, said cavity being curved on two unequal radii, substantially as described.

3. In the manufacture of ingots, the combination with an ingot mold having an open lower end and having a cavity of rectangular cross section, and the lower end of said mold being cut away to form a true hemispherical surface, of a mold stool supporting said mold, said stool having a hemispherical depression in which said mold is seated, and a marginal flange intersecting with and extending above the bottom of said depression to prevent accidental displacement of said mold.

4. In the manufacture of ingots, the combination with an ingot mold stool having a curved depression in its upper face, and a marginal flange extending upwardly above the bottom of said depression, of a mold having an open lower end and having a cavity of rectangular cross section, said mold having its lower end cut away and curved to snugly fit on the bottom of said curved depression in said stool.

In testimony whereof I have hereunto set my hand.

BENJAMIN P. HAZELTINE.